June 29, 1926.
C. W. SWANSON
BACON SKINNING MACHINE
Filed Dec. 15, 1925
1,590,708
2 Sheets-Sheet 2
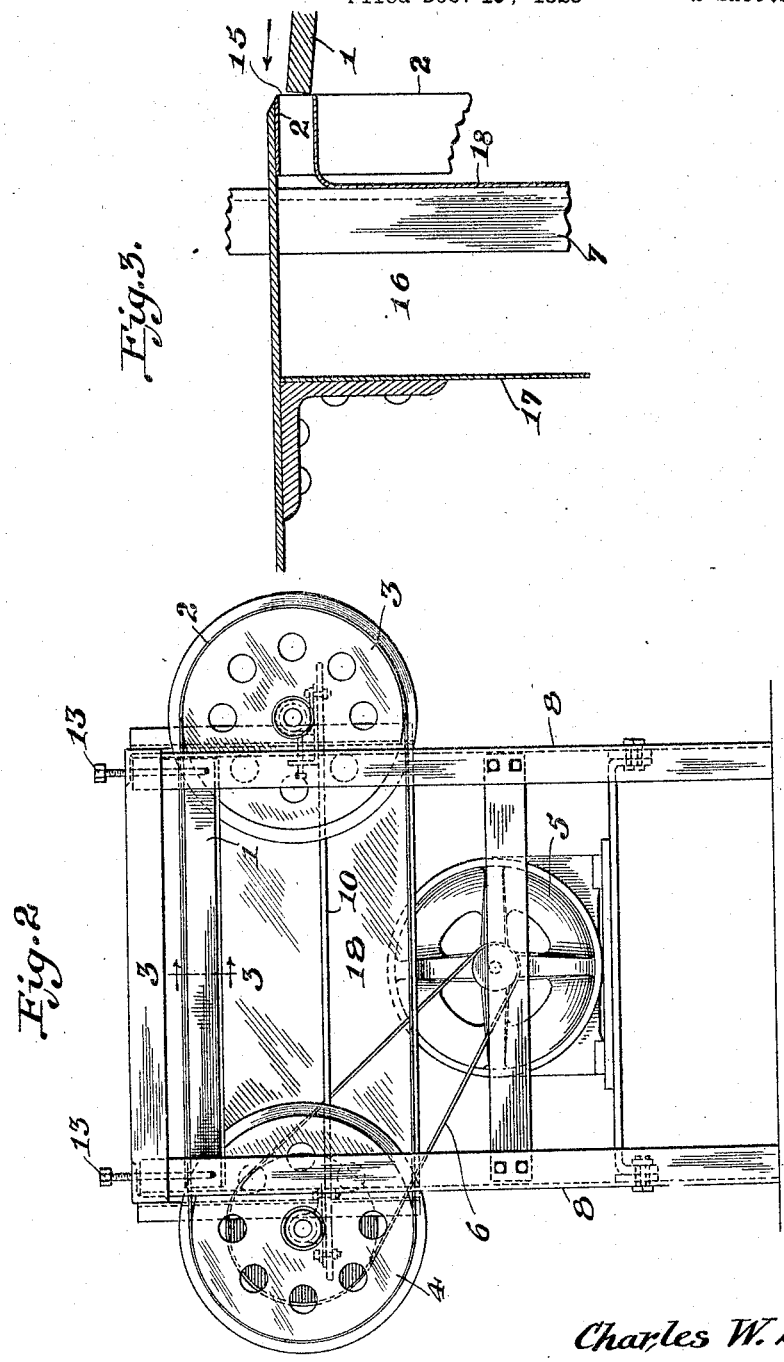
Inventor
Charles W. Swanson
By Mason, Fenwick Lawrence
Attorneys Patented June 29, 1926.

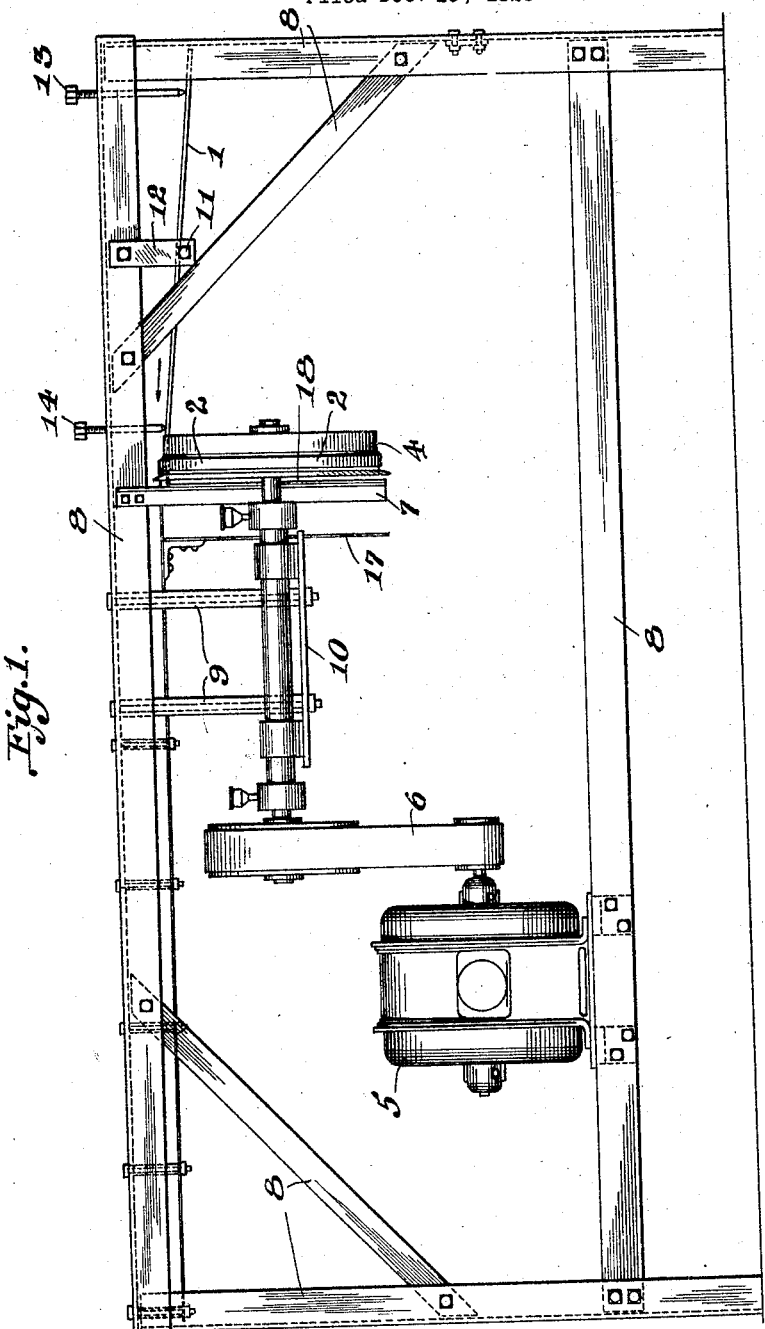

1,590,708

UNITED STATES PATENT OFFICE.

CHARLES W. SWANSON, OF OTTUMWA, IOWA, ASSIGNOR TO JOHN MORRELL & CO., OF OTTUMWA, IOWA.

BACON-SKINNING MACHINE.

Application filed December 15, 1925. Serial No. 75,557.

This invention relates to improvements in skinning and rinding machines, particularly in machines adapted for removing the skins or rinds from bacon.

An object of the invention is to provide a machine for removing the skin or rind from bacon or other meats, wherein the thickness of the skin or rind to be removed may be readily varied.

Further objects of this invention will appear from the following detailed description of the apparatus and in the disclosure set forth in the two sheets of drawings which are herewith made a part of this application.

In the drawing:—

Fig. 1 illustrates a side elevational view of the bacon skinning machine in assembled form.

Fig. 2 represents an end elevational view of Fig. 1.

Fig. 3 illustrates a vertical sectional view of a portion of the bacon skinning machine taken on line 3—3 of Fig. 2.

Numeral 1 designates a smooth iron table or a support of any other suitable material and shape, which is adapted to carry the bacon or other matter which it is intended to treat. The bacon may be moved by hand or otherwise across the supporting table 1 into the movable knife edge 2, which may be in the form of an endless cutting blade adapted to revolve around suitably located pulleys 3 and 4 driven by means of an ordinary motor 5 and belting or chains 6.

The pulleys may be supported in any suitable manner by means of hangers 7, 9 and 10 attached to the framework 8 of the skinning machine.

The table 1 is adapted to be suspended from the machine frame 8 in such a manner that it will pivot on a rod 11 held suspended from the frame 8 by means of hangers 12.

In order to adjust the table 1 for the regulation of the thickness of the skin portion to be removed, threaded rods 13 and 14 are suitably located in the framework 8 in such a manner that by their manipulation, the plate 1 may be adjusted for any desired angle in relation to the cutting knife 2, thereby varying at will, the space 15 which obviously regulates the thickness of the skin or rind to be removed by the moving cutting edge.

On leaving the table 1, the removed rind or skin is adapted to pass into a chute 16 which may be made of any desirable material, preferably of guard strips composed of sheet metal as at 17 and 18, the guard strips being connected with the framework 8 in any suitable manner.

The rod 11 upon which the table portion 1 pivots, may be suitably welded or otherwise secured to the table.

In operation, this invention provides a skinning machine particularly adapted for removing rinds or skin from bacon. The bacon may be moved by hand across the table into the movable cutting blade or knife, the table 1 having been previously adjusted by means of threaded rods to the desired angle, thereby adjusting the thickness of the skin which is to be removed or separated from the bacon or fat portions.

The prime object of this adjustable feed table is to provide a support for the bacon while the skin is being separated and at the same time, suitable means is provided for adjusting the thickness of the rind removed.

The apparatus as described and claimed in this application is particularly adapted for separating the rind from smoked bacon.

What I claim is:—

1. In a bacon skinning machine having a support for the bacon, a suitable cutting edge for removing the skin, and adjustable means for varying the thickness of the skin portion removed by the cutting edge comprising means for pivotally suspending the support, and means arranged to bear upon opposite ends of the support for changing the angular relation thereof with respect to the cutting edge.

2. In a skinning machine, a support for the matter to be skinned, a movable knife edge, means for moving the knife edge, and adjustable means for varying the thickness of the skin portion removed by the knife edge comprising a suspension rod pivotally suspending the support and adjusting screws bearing upon the support for changing the angular relation thereof with respect to the horizontal.

In testimony whereof I affix my signature.

CHARLES W. SWANSON.